United States Patent [19]

Bartilson et al.

[11] Patent Number: 4,584,861
[45] Date of Patent: Apr. 29, 1986

[54] KNURLING TOOL

[75] Inventors: Benjamin M. Bartilson, Columbus; Richard D. Kreachbaum, Westerville; Thomas A. Pettenski, Columbus; John T. Voedisch, Worthington, all of Ohio

[73] Assignee: Battelle Development Corporation, Columbus, Ohio

[21] Appl. No.: 627,370

[22] Filed: Jul. 3, 1984

[51] Int. Cl.$^4$ .................. B21H 1/20; B21H 7/14; B21H 7/18
[52] U.S. Cl. ........................... 72/214; 72/478; 72/703; 29/125
[58] Field of Search ............... 72/100, 703, 102, 113, 72/186, 184, 224, 214, 220, 78, 73, 74, 362, 367, 478; 83/664; 29/125

[56] References Cited

U.S. PATENT DOCUMENTS

| | | | |
|---|---|---|---|
| 289,910 | 12/1883 | Grunder | 29/125 |
| 475,700 | 5/1892 | Ohl | 72/186 |
| 988,915 | 4/1911 | Wadsworth | 72/703 |
| 1,262,205 | 4/1918 | Joline | 29/125 |
| 1,366,571 | 1/1921 | larsen | 29/125 |
| 1,463,801 | 8/1925 | Cosgrove et al. | 29/125 |
| 1,527,175 | 2/1925 | Desautels | 29/125 |
| 1,580,975 | 4/1926 | Retterath | 72/220 |
| 2,586,011 | 2/1952 | Doelter | 72/366 |
| 2,991,672 | 7/1961 | Meyer et al. | 72/100 |
| 3,351,001 | 11/1967 | Achkio | 29/125 |
| 3,750,444 | 8/1973 | Bittner | 72/367 |
| 3,768,291 | 10/1973 | Rieger | 72/78 |
| 4,114,415 | 9/1978 | Mikhailovich et al. | 72/214 |
| 4,116,032 | 9/1978 | Krapfenbauer | 72/100 |
| 4,215,084 | 7/1980 | Maringer | 164/130 |

FOREIGN PATENT DOCUMENTS 90333  5/1983  Japan .................. 72/703

Primary Examiner—Lowell A. Larson
Attorney, Agent, or Firm—Benjamin Mieliulis

[57] ABSTRACT

A composite assembly knurling tool for forming uniformly-spaced horizontal serrations continuous across the surface of a metal flake producing drum is disclosed. The knurling tool comprises an alternating array of spacer and forming discs substantially conforming to the contour of the metal flake producing drum.

1 Claim, 4 Drawing Figures

KNURLING TOOL

BACKGROUND OF THE INVENTION

This invention relates to metal flake production technology, more particularly, this invention relates to a knurling tool useful for forming multiple uniform serrated edges on a heat extracting drum such that the drum would have uniform discrete serrations transversely along the peripheral surface, or in other words, parallel to the axis of rotation. In producing metal flake, the leading surfaces of the serrations contact molten material and have formed thereon flake particles.

As used herein the terms flake particles, flakes and flake refer to particles of relatively small size, in the hundreths of an inch range, and the terms include particles frequently referred to as powders because of their relatively small size.

U.S. Pat. No. 4,154,284, commonly assigned, disclosed a method for producing metal flake of small length-to-width ratio directly from a pool of molten metal. Said method involved use of a generally circular serrated-edge, heat-extracting disk-like member touching the surface of a molten pool.

U.S. Pat. No. 4,215,084 disclosed an advancement in the art consisting of a drum-like heat extracting member consisting of a serrated copper-sleeved, water-jacketed drum. Said application disclosed that the flake production rate can be increased by the use of multiple molten streams projected upon a serrated drum-like member. A substantially rectangular flake product is produced. For certain application such as roofing, a flake product with length and width being substantially equal is preferred. The length, width, and thickness of the flake product are influenced and controlled by factors such as the width or diameter and flow rate of the molten metal stream, the viscosity of the molten metal, the speed of rotation of the serrated drum, and the configuration of the serrated drum and serrations, including the length of the angular surfaces and the height of the radial surfaces.

While a serrated drum-like member can markedly increase flake production, manufacture of acceptable serrated drums required painstaking precision to achieve acceptable and reproducible results. Copper drum surfaces are difficult to uniformly serrate while maintaining precise tolerances. On a 22" diameter drum, and a serration of 0.06 inches in width (0.0025" depth) about 1152 uniform transverse serrations are required ($22 \cdot \pi + 0.06 = 1152$). In addition the angular surface of the serrated drum wears with time and usage thus requires periodic reconditioning. Each serration consists of a radial surface and an angular surface inclined at an angle $\theta$ to the tangent of curvature of the drum. For optimum flake product dimensions and product uniformity it is necessary that each of the multiple radial and angular surfaces comprising the drum surface be formed substantially uniform in size and orientation, and continuous across the surface of the drum.

It had been the practice to form the serrations in the drum surface by means of repetitive dropping of a weighted (170–190 lbs./force) precisely shaped chisel following incremental movements of the drum. When a full turn of the drum was made and a serrations impacted to the surface, the chisel was incrementally moved sideways and the process repeated. This would continue until the full width of the drum was serrated. Besides being time consuming since thousands of uniform serrations were necessary, the final drum had rows of serrations which were not always in perfect registry with each other. These imperfections would give rise to a coproduced stringly scrap product when flake was being produced.

Later processes used a paddle wheel shaped tool to impress multiple rows of serrations into the drum surface by turning both wheels while in pressed contact. This method also yielded nonuniform serrations often not in registry transversely across the surface of the drum.

The above factors made the metal flake production process expensive in terms of tooling and machining costs. Commercial acceptance of metal flake production using serrated drum technology could be enhanced if efficient precision serrating of the drum surface would be feasible. The present invention provides a knurling tool for forming multiple uniform serrations precise in size and orientation and in registry transversely across the surface of a metal flake forming drum.

SUMMARY OF THE INVENTION

The invention as herein disclosed is a composite assembly knurling tool for forming uniformly-spaced horizontal serrations in the surface of a drum. The serrations are formed horizontal, in other words, parallel to the axis of rotation of the drum. The drum has radial symmetry about this axis.

The knurling tool of the present invention is comprised of alternating spacer and cutting discs. The alternating spacer and cutting discs are sized to substantially conform to the curvature of the drum surface. Thus, for example, if the center cutting disc is lined up to serrate in line with the axis of the drum, the discs placed on either side of the center cutting disc will each be incrementally of larger diameter to compensate for the curvature of the drum surface. Additionally the angular surface of each cutting disc is incrementally adjusted to maintain a constant angle $\theta$ relative to the tangential surface of the drum.

The knurling tool is held by a rigid housing means preferably having adjustable pressure controls. The housing means guides and presses the knurling tool across the surface of the drum. The knurling tool serrates the drum surface by means of impression when the knurling tool is moved and rolled longitudinally across the surface of the drum.

DESCRIPTION OF THE DRAWINGS

FIG. 1 is a side view of a heated nozzle discharging molten metal onto the surface of a serrated metal flake producing drum. FIG. 2 is a front view of a metal flake producing drum depicted with multiple molten metal streams projected onto the serrated drum surface from a preferred graphite tube having spaced molten metal discharge holes.

DETAILED DESCRIPTION OF THE INVENTION

The knurling tool of the present invention is comprised of multiple cutting discs, substantially conforming to the curvature of the drum, held in a composite assembly and designed to transversely serrate the surface of a metal flake producing drum. The knurling tool is designed to be guided by a rigid housing and while pressed against the surface of the drum, rolled transversely across the drum surface to impress a precisely spaced and formed series of serrations continuous across the surface of the drum. The serrations have an angular surface and a radial surface. The knurling tool of the present invention is designed to substantially conform and mesh with the general surface contour of the finished serrated drum.

Figure 1:
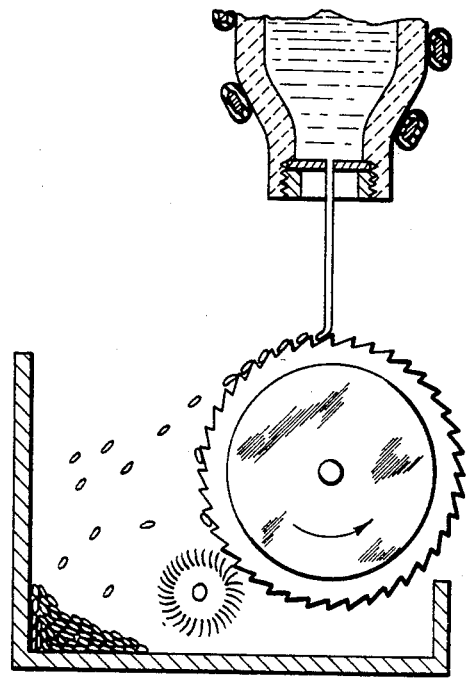
FIGS. 1 and 2 are prior art drawings for aid in understanding metal flake production technology.
Figure 2:
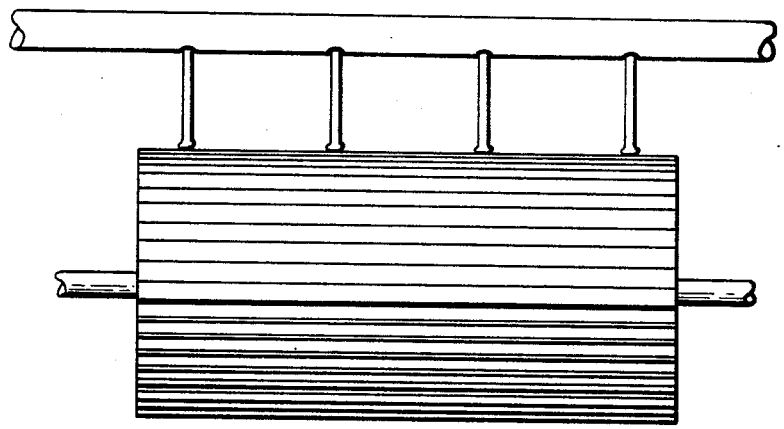
Figure 3:
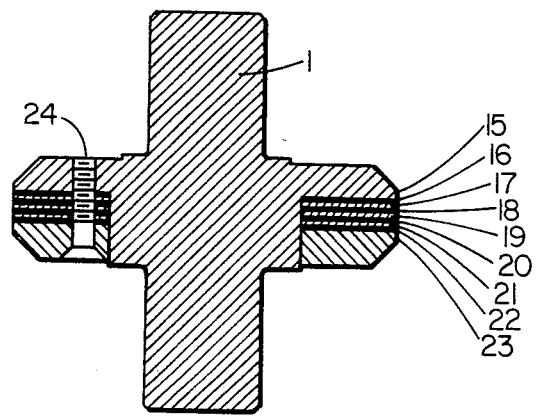
FIG. 3 is a cross-sectional view of a knurling tool in one embodiment of the invention.

The knurling tool of the present invention is illustrated in FIG. 3. The knurling tool consists of a composite assembly of multiple stacked knurling or forming discs or plates having a peripheral edge of precise geometry. Each forming disc has a protruding radial surface and has an angular surface around its perimeter forming an acute angle with one surface of the disc. Between each knurling or forming disc, an optional but preferred spacer disc or plate can be sandwiched. The forming disc is designed to form the angular surface in the drum serrations by application of pressure while the knurling tool is moved transversely across the face of the drum. When the optional spacer discs are included, a tangential surface is also formed on the surface of the drum between the angular surface and the radial surface. The forming disc also forms the radial surface of the serrations on the drum.

Bolt 24 holds the stack of forming discs 16, 18, 20, and 22 and spacer discs 15, 17, 19, 21 and 23 in position.

The knurling tool is rotated about axial member 1 by being designed to be journaled or inserted in a chuck or bearing housing and rotated. A free rolling bearing housing is preferred such that the knurling tool serrates the drum surface by means of impression when rolled across the surface of the drum.

Since the forming discs and spacer discs are removable, the tool can be readily customized to drums of different diameters.

The edges of the forming discs and spacer discs of the knurling tool are matched to correspond with and mesh with an arc of a circle as defined by the tips of the drum serrations when the drum is viewed sideways from either end and the knurling tool is positioned to be rolled longitudinally across the surface of the drum. In other words, forming discs set on either side of the forming disc knurling at top dead center are progressively larger in diameter to correspond to the curvature of the drum.

Figure 4:
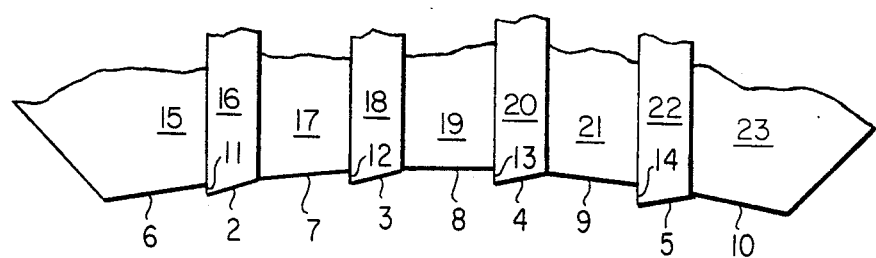
FIG. 4 is a close up view of the configuration and geometry of the edges of the forming discs and spacer discs of the knurling tool depicted in FIG. 3.

Looking at FIG. 4 the knurling tool knurling edge is comprised of spacer discs 15, 17, 19, 21 and 23. Between the spacer discs, forming discs 16, 18, 20 and 22 are set. Spacer discs 15, 17, 19, 21 and 23 have tangential surfaces 6, 7, 8, 9, and 10 respectively. Forming discs 16, 18, 20 and 22 have angular surfaces 2, 3, 4 and 5 respectively and also protruding radial surfaces 11, 12, 13 and 14 respectively. Axial member 1 accepts and retains the forming discs and spacer discs. In FIG. 4 the spacer discs shown on the ends form part of the axial member and thus also function in disc retainment.

In the preferred embodiment to knurl a 22" diameter drum angular surface 2 is inclined relative to horizontal at 8° 45'. Angular surface 3 is inclined at 7° 18'. Angular surface 4 is inclined at 5° 51'. Angular surface 5 is inclined at 7° 18'.

In the preferred embodiment, the diameter of forming disc 16 was made 0.001" greater than the diameter of forming disc 18 and 20. A basic diameter of 2.000" was used. The diameter of forming disc 22 was made 0.001" greater than the diameter of spacer discs 17 and 19. Radial surfaces 11, 12, 13 and 14 each measured 0.0025" in height. Spacer discs 17, 19, and 21 generally measured 0.0375" in thickness. Each forming disc measured 0.0225" in thickness.

It is possible to make each of the angular surfaces of identical inclination. In one embodiment one forming disc sandwiched between two spacer discs was employed, however, multiple n forming discs are preferred. In the preferred embodiment 4 forming discs were employed with 3 spacer discs set alternately between the 4 forming discs. Spacer discs were also set on both ends and are part of the array of forming discs and spacer discs. Thus, n≠1 spacer discs are preferred.

The spacer discs have a circumferential periphery generally parallel to the axis of rotation of the disc. In the preferred embodiment the periphery of each spacer disc would be made tangential to the metal flake forming drum. With multiple spacer discs, each spacer disc is made tangential to the drum, and thus would substantially conform to the curvature of the metal flake forming drum.

The knurling tool of the present invention consists of multiple stacked plates or discs corresponding to an arc of the circle defined by the base of the drum at the edge formed by the base and peripheral surface of the drum. The stacked discs consist of forming discs having an angular surface, and spacer discs. Each forming disc has an angular surface as a circumferential periphery designed to coincide with the angular surface $\theta$ desired in the drum surface serration. To maintain a constant angular surface on the drum at angle $\theta$, each successive forming disc set on either side of the disc in radial alignment with the axis of the drum must have its angular surface slightly or incrementally adjusted.

Spacer discs are set on opposite sides of the forming discs and between succesive forming discs. Each forming disc has one edge defining a circle of diameter similar to the diameter of one abutting spacer disc and one edge, being the edge formed by the protruding radial surface and angular surface, defining a circle of diameter larger than the diameter of the abutting spacer disc on the other side. The larger diameter edges of successive forming discs should be on the same side.

A housing or framing means such as a pivot frame can serve as a means for guiding the knurling tool transversely across the peripheral surface of the drum while pressing the knurling tool against the surface of the drum to form an impression. Force was exerted by a cylinder behind the knurling tool. 800 to 1500 lbs/sq.in. pressure have been used. Approximately 1200 lbs/sq.in. has been found optimum when the forming disc is composed of high speed tool steel and the drum is copper. Different pressures may be required depending upon the particular copper surface and its metallic state, whether annealed or work hardened.

A worm gear or notching system or pin and pin retractor with spaced holes types of systems, well known to those skilled in the art, can be used to incrementally turn the drum or knurling tool such that a new sectional surface of the drum is exposed after each transverse serration is formed.

It is herein understoood that although the present invention has been specifically disclosed with the preferred embodiments, modifications and variations of these concepts herein disclosed, such as for example making the forming discs and spacer discs an integral one piece unit or assembly, may be resorted to by those skilled in the art all without departing from the spirit and scope of the appended claims. Such modifications and variations are considered to be within the scope of the invention and the appended claims.

We claim:

1. A knurling tool for impressing uniform serrations across the surface of a metal flake producing drum parallel to the axis of rotation, wherein each serration consists of a radial surface, and an angular surface inclined at an acute angle $\theta$ to the tangent of curvature of the drum, said knurling tool comprising:
- a multiplicity n of forming discs, each forming disc having an angular surface around the perimeter of the disc forming an acute angle with one surface of the forming disc;
- at least $n+1$ spacer discs abutting on opposite sides of and alternating between the forming discs forming an alternating array, each spacer disc having a circumferential periphery tangential to the drum surface;
- an axial member for accepting and retaining the discs;
- journaling means for providing free rotation to said knurling tool; and
- each said forming disc having one circumferential edge defining a circle of diameter substantially similar to the diameter of the abutting spacer disc and one circumferential edge of said forming disc defining a circle of larger diameter than the diameter of the abutting spacer disc on that opposite side, the larger of the circumferential edges of each of the forming discs together in said alternating array defining a contour substantially appoaching that of a hyperboloid.

* * * * *